United States Patent
Higurashi et al.

(10) Patent No.: US 6,504,991 B1
(45) Date of Patent: Jan. 7, 2003

(54) MAGNETIC RECORDING APPARATUS, MAGNETIC REPRODUCING APPARATUS, AND RELATED METHODS

(75) Inventors: Seiji Higurashi, Fuchu (JP); Yoichi Zenno, Tokyo (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/321,606

(22) Filed: May 28, 1999

(30) Foreign Application Priority Data

Jul. 9, 1998 (JP) .......................................... 10-193866

(51) Int. Cl.$^7$ ................................................ H06N 5/91
(52) U.S. Cl. .............................. 386/67; 386/74; 386/81
(58) Field of Search .............................. 386/67, 68, 71, 386/72, 74, 79, 80, 81, 85, 86, 87, 6, 7, 46, 1, 13, 21, 23, 40, 124; 360/27, 73.12, 76, 78.15; H06N 5/91

(56) References Cited

U.S. PATENT DOCUMENTS 4,811,127 A * 3/1989 Okauchi
5,140,435 A * 8/1992 Suzuki et al.

FOREIGN PATENT DOCUMENTS

EP 0 632 438 1/1995
JP 7-153142 6/1995

* cited by examiner

Primary Examiner—Robert Chevalier
(74) Attorney, Agent, or Firm—Louis Woo

(57) ABSTRACT

First and second magnetic heads provided on a rotary drum alternately scan a magnetic tape. The first and second magnetic heads are different from each other in azimuth angle. A digital information signal is fed to the first magnetic head and is recorded on the magnetic tape via the first magnetic head while the first magnetic head is scanning the magnetic tape in a long time recording mode of operation where the magnetic tape is driven at a speed equal to a predetermined standard speed multiplied by 1/N. Here, N denotes a predetermined integer equal to or greater than 2. The digital information signal is fed to the second magnetic head and is recorded on the magnetic tape via the second magnetic head while the second magnetic head is scanning the magnetic tape in the long time recording mode of operation. In the long time recording mode of operation, the feed of the digital information signal to the first magnetic head and the second magnetic head is inhibited during an (N−1)/2 turn of the rotary drum after either the feed of the digital information signal to the first magnetic head or the feed of the digital information signal to the second magnetic head. A control pulse signal is recorded on the magnetic tape via a third magnetic head which is fixed. The control pulse signal has a period corresponding to one turn of the rotary drum. The control pulse signal has a duty cycle depending on timings at which the first and second magnetic heads record the digital information signal on the magnetic tape.

7 Claims, 7 Drawing Sheets

MAGNETIC RECORDING APPARATUS, MAGNETIC REPRODUCING APPARATUS, AND RELATED METHODS

BACKGROUND OF THE INVENTION

1. Field of the Invention

This invention relates to an apparatus for recording a digital signal on a magnetic tape. Also, this invention relates to an apparatus for reproducing a digital signal from a magnetic tape. In addition, this invention relates to a method of recording a digital signal on a magnetic tape. Furthermore, this invention relates to a method of reproducing a digital signal from a magnetic tape.

2. Description of the Related Art

A typical digital VTR (video tape recorder) divides a digital signal into a sequence of data blocks, and records the digital signal on a magnetic tape data-block by data-block. During a playback mode of operation, the typical digital VTR reproduces the digital signal from the magnetic tape.

There is a prior-art digital-signal recording and reproducing apparatus of a helical scan type which includes two magnetic heads having different azimuths respectively and mounted on a rotary drum. The two magnetic heads are diametrically opposed to each other. A magnetic tape is wrapped around the outer circumferential surface of the rotary drum along a part of a helix through an angular range of about 180 degrees. During a recording mode of operation, the prior-art apparatus divides a digital signal into a sequence of data blocks. The magnetic heads record the digital signal on the magnetic tape data-block by data-block while the magnetic tape is driven at a constant speed. During a playback mode of operation, the magnetic heads reproduce the digital signal from the magnetic tape while the magnetic tape is driven at the constant speed.

The mode of operation of the prior-art apparatus is changed depending on the drive speed of the magnetic tape. During a standard recording mode and a standard playback mode of operation, the magnetic tape is driven at a predetermined standard speed. The prior-art apparatus which operates in the standard recording mode can continuously record a digital signal having a data rate of 14.1 Mbps on a 120-minute S-VHS (trademark) tape for 240 minutes.

For a digital signal having a data rate lower than 14.1 Mbps, it is known to intermittently implement recording as follows. The tape drive speed is set to 1/N times the standard speed while the recording of the digital signal on the magnetic tape is implemented once in every N/2 turns (revolutions) of the rotary drum. Here, "N" denotes an odd integer greater than "1". The recording rate provided by the intermittent recording is equal to 1/N times that by the standard recording. The longest record time provided by the intermittent recording is equal to N times that by the standard recording.

The prior-art apparatus includes servo control circuits for the rotary drum and the magnetic tape respectively. Operation of the servo control circuits, which occurs during the standard recording mode or the standard playback mode of operation of the prior-art apparatus, is disclosed. On the other hand, operation of the servo control circuits, which occurs during the intermittent recording, is unknown.

There is a conventional time-lapse VTR which intermittently implements recording of an analog signal for a long time. In the time-lapse VTR, a magnetic tape is driven at a low speed or driven intermittently. In addition, a rotary head intermittently records the analog signal on the magnetic tape.

SUMMARY OF THE INVENTION

It is a first object of this invention to provide an improved magnetic recording apparatus.

It is a second object of this invention to provide an improved magnetic reproducing apparatus.

It is a third object of this invention to provide an improved method of magnetic recording.

It is a fourth object of this invention to provide an improved method of magnetic reproduction.

A first aspect of this invention provides a magnetic recording apparatus having a rotary drum and being able to operate in a long time recording mode. The apparatus comprises first and second magnetic heads provided on the rotary drum and alternately scanning a magnetic tape, the first and second magnetic heads being different from each other in azimuth angle; first means for feeding a digital information signal to the first magnetic head and enabling the digital information signal to be recorded on the magnetic tape via the first magnetic head while the first magnetic head is scanning the magnetic tape in the long time recording mode of operation where the magnetic tape is driven at a speed equal to a predetermined standard speed multiplied by 1/N, and N denotes a predetermined integer equal to or greater than 2; second means for feeding the digital information signal to the second magnetic head and enabling the digital information signal to be recorded on the magnetic tape via the second magnetic head while the second magnetic head is scanning the magnetic tape in the long time recording mode of operation; third means for, in the long time recording mode of operation, inhibiting the feed of the digital information signal to the first magnetic head and the second magnetic head by the first means and the second means during an (N−1)/2 turn of the rotary drum after either the feed of the digital information signal to the first magnetic head by the first means or the feed of the digital information signal to the second magnetic head by the second means; a third magnetic head being fixed and scanning the magnetic tape; and fourth means for generating a control pulse signal, and feeding the generated control pulse signal to the third magnetic head and enabling the generated control pulse signal to be recorded on the magnetic tape via the third magnetic head, the generated control pulse signal having a period corresponding to one turn of the rotary drum, the generated control pulse signal having a duty cycle depending on timings at which the first and second magnetic heads record the digital information signal on the magnetic tape.

A second aspect of this invention is based on the first aspect thereof, and provides a magnetic recording apparatus wherein the fourth means comprises means for setting the duty cycle of the control pulse signal to a first predetermined value during one turn of the rotary drum immediately before the first magnetic head scans the magnetic tape and the digital information signal is fed to the first magnetic head by the first means, and means for setting the duty cycle of the control pulse signal to a second predetermined value during other time intervals, the second predetermined value being different from the first predetermined value.

A third aspect of this invention is based on the first aspect thereof, and provides a magnetic recording apparatus further comprising fifth means for reproducing the control pulse signal from the magnetic tape via the third magnetic head; sixth means for detecting a duty cycle of the reproduced control pulse signal; seventh means for deciding a recording track sequence on the basis of the detected duty cycle; and eighth means for implementing assemble recording on the magnetic tape via the first and second magnetic heads while maintaining the decided recording track sequence.

A fourth aspect of this invention provides an apparatus for reproducing a digital information signal from a magnetic tape in a long time playback mode of operation. The apparatus has a rotary drum and generates a drum pulse signal synchronous with rotation of the rotary drum. The magnetic tape stores a control pulse signal having a period corresponding to one turn of the rotary drum. The control pulse signal has a duty cycle depending on timings at which two magnetic heads of different azimuths record the digital information signal on the magnetic tape. The apparatus comprises first and second magnetic heads provided on the rotary drum and alternately scanning the magnetic tape to reproduce the digital information signal therefrom, the first and second magnetic heads being different from each other in azimuth angle; first means for reproducing the control pulse signal from the magnetic tape; second means for detecting the duty cycle of the control pulse signal reproduced by the first means; third means for deciding time intervals during which the digital information signal is effectively reproduced from the magnetic tape by the first and second magnetic heads in response to the duty cycle detected by the second means and the drum pulse signal, and for generating a reproduction control signal representing the decided time intervals; a reproducing circuit for processing output signals of the first and second magnetic heads; and fourth means for controlling the reproducing circuit in response to the reproduction control signal generated by the third means.

A fifth aspect of this invention is based on the fourth aspect thereof, and provides an apparatus wherein the third means comprises first sub means for deciding whether or not the detected duty cycle corresponds to the first magnetic head; a synchronous counter for counting up every leading edge in the drum pulse signal in cases where the first sub means decides that the detected duty cycle does not correspond to the first magnetic head, the synchronous counter being reset by a leading edge in the drum pulse signal in cases where the first sub means decides that the detected duty cycle corresponds to the first magnetic head; and second sub means for generating the reproduction control signal in response to an output signal of the synchronous counter and the drum pulse signal.

A sixth aspect of this invention provides a method of magnetic recording in modes of operation which include a long time recording mode of operation. The method comprises the steps of 1) feeding a digital information signal to a first magnetic head and enabling the digital information signal to be recorded on a magnetic tape via the first magnetic head while the first magnetic head is scanning the magnetic tape in the long time recording mode of operation where the magnetic tape is driven at a speed equal to a predetermined standard speed multiplied by 1/N, and N denotes a predetermined integer equal to or greater than 2; 2) feeding the digital information signal to a second magnetic head and enabling the digital information signal to be recorded on the magnetic tape via the second magnetic head while the second magnetic head is scanning the magnetic tape in the long time recording mode of operation, wherein the first and second magnetic heads are provided on a rotary drum and alternately scan the magnetic tape, and the first and second magnetic heads are different from each other in azimuth angle; 3) in the long time recording mode of operation, inhibiting the feed of the digital information signal to the first magnetic head and the second magnetic head by the step 1) and the step 2) during an (N−1)/2 turn of the rotary drum after either the feed of the digital information signal to the first magnetic head by the step 1) or the feed of the digital information signal to the second magnetic head by the step 2); and 4) generating a control pulse signal, and feeding the generated control pulse signal to a third magnetic head and enabling the generated control pulse signal to be recorded on the magnetic tape via the third magnetic head, the third magnetic tape being fixed and scanning the magnetic tape, the generated control pulse signal having a period corresponding to one turn of the rotary drum, the generated control pulse signal having a duty cycle depending on timings at which the first and second magnetic heads record the digital information signal on the magnetic tape.

A seventh aspect of this invention provides a method of reproducing a digital information signal from a magnetic tape in a long time playback mode of operation. The method generates a drum pulse signal synchronous with rotation of a rotary drum. The magnetic tape stores a control pulse signal having a period corresponding to one turn of the rotary drum. The control pulse signal has a duty cycle depending on timings at which two magnetic heads of different azimuths record the digital information signal on the magnetic tape. The method comprises the steps of 1) reproducing the control pulse signal from the magnetic tape; 2) detecting the duty cycle of the control pulse signal reproduced by the step 1); 3) deciding time intervals during which the digital information signal is effectively reproduced from the magnetic tape by first and second magnetic heads in response to the duty cycle detected by the step 2) and the drum pulse signal, and generating a reproduction control signal representing the decided time intervals, wherein the first and second magnetic heads are provided on the rotary drum and alternately scan the magnetic tape to reproduce the digital information signal therefrom, and the first and second magnetic heads are different from each other in azimuth angle; 4) processing output signals of the first and second magnetic heads; and 5) controlling the processing by the step 4) in response to the reproduction control signal generated by the step 3).

DESCRIPTION OF THE PREFERRED EMBODIMENT

Background-art and conceivable apparatuses will be explained below for a better understanding of this invention.

A background-art recording and reproducing apparatus can operate in an LP mode (a long-playing mode) during which a tape drive speed is set to 1/3 times a standard speed, and the recording of a digital signal on a magnetic tape is implemented once in every 3/2 turns (revolutions) of a rotary drum.

Figure 1:
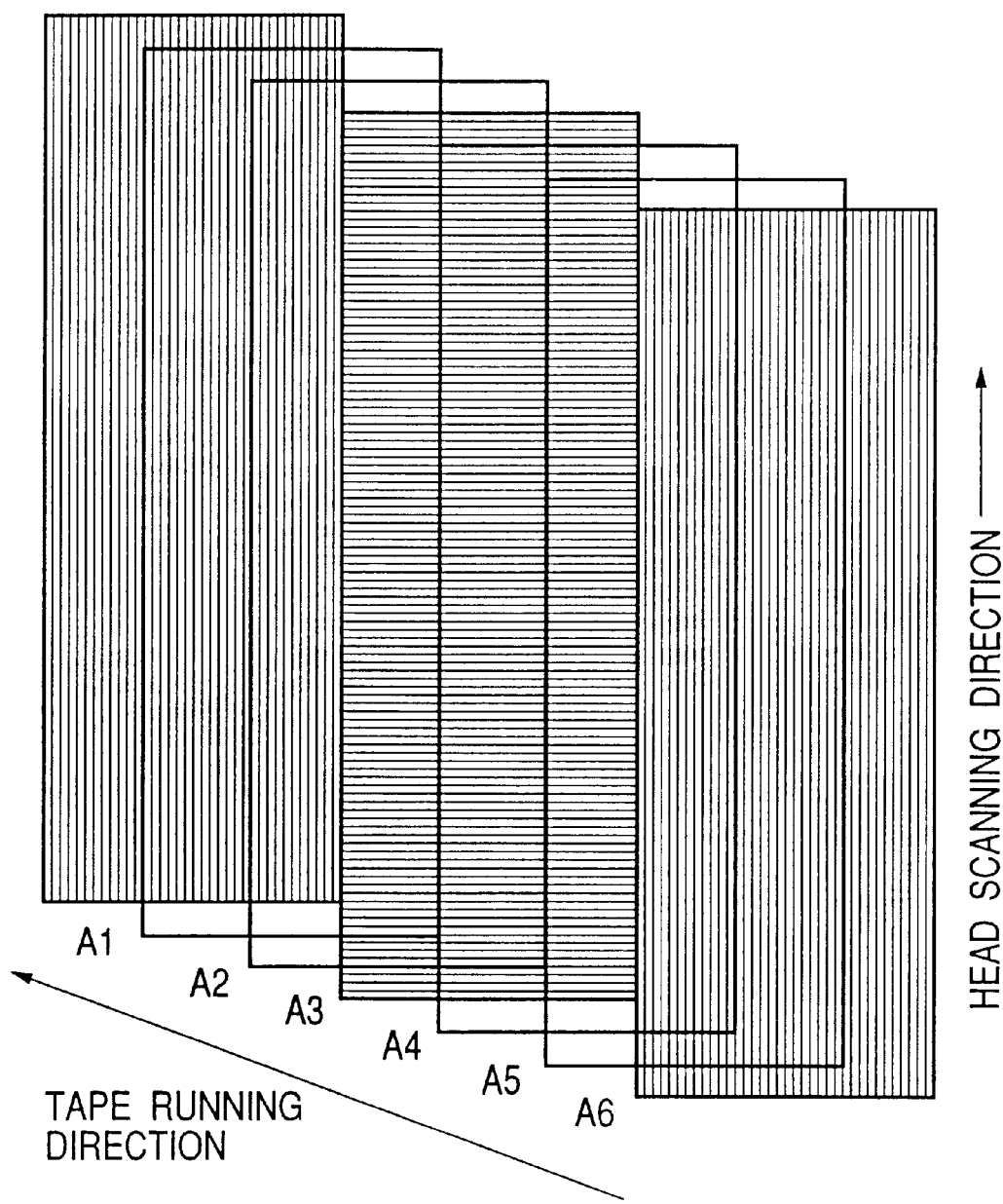
FIG. 1 is a diagram of a track pattern on a magnetic tape which is formed during a 1/3-speed recording mode of operation.
Figure 2:
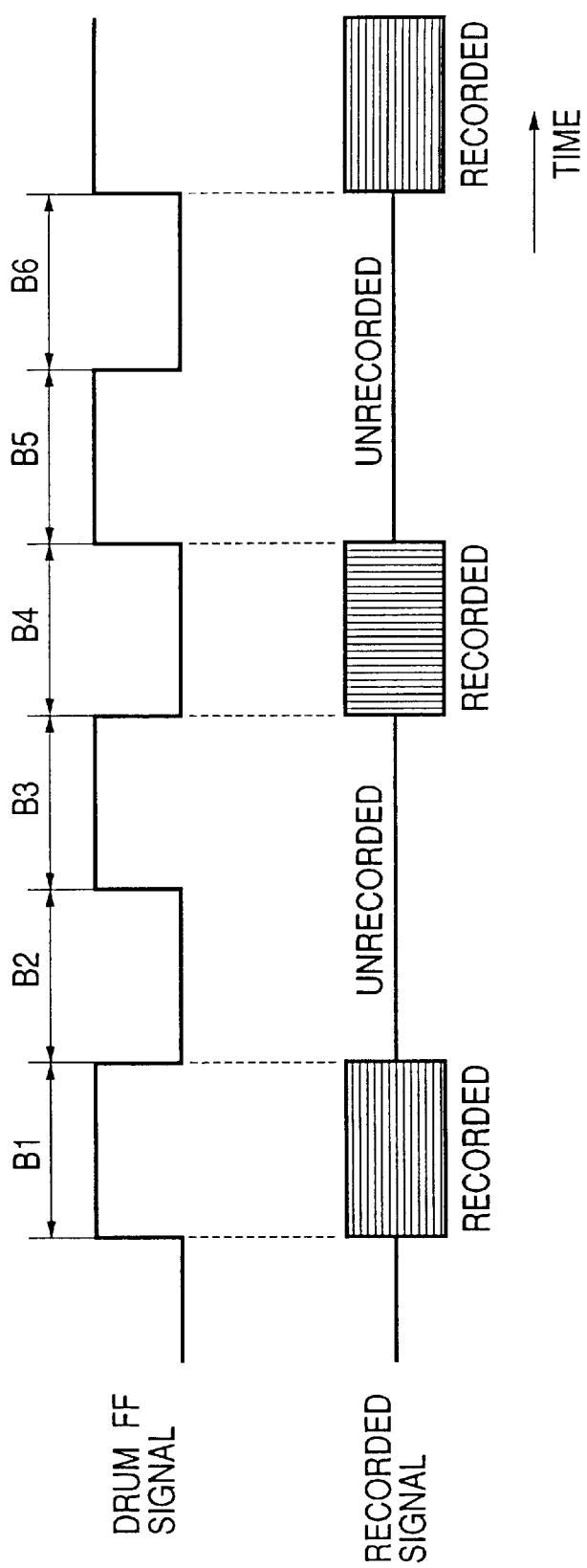
FIG. 2 is a time-domain diagram of a drum flip-flop signal, and a main signal recorded on a magnetic tape via magnetic heads in a 1/3-speed recording mode of operation.

During the LP mode of operation, as shown in FIG. 1, the magnetic tape is scanned alternately by two magnetic heads along sequential slant tracks A1, A2, A3, . . . . A drum flip-flop generates a signal having a symmetrical rectangular waveform. As shown in FIG. 2, the polarity of the drum flip-flop signal changes for every half turn (every 180-degree rotation) of the rotary drum. In FIG. 2, B1, B2, B3, . . . denote successive half-turn time intervals respectively.

In the LP mode of operation, the recording of the digital signal on the magnetic tape responds to the drum flip-flop signal as follows. During the first half-turn time interval B1, the first magnetic head records the digital signal on the magnetic head along the first slant track A1. During the second and third half-turn time intervals B2 and B3, the digital signal remains fed to neither the first magnetic head nor the second magnetic head and hence continues to be unrecorded although the magnetic tape is scanned by the first and second magnetic heads. Accordingly, the recording of the digital signal along the second and third slant tracks A2 and A3 remains inhibited. During the fourth half-turn time interval B4, the second magnetic head records the digital signal on the magnetic head along the fourth slant track A4. During the fifth and sixth half-turn time intervals B5 and B6, the digital signal remains fed to neither the first magnetic head nor the second magnetic head and hence continues to be unrecorded although the magnetic tape is scanned by the first and second magnetic heads. Accordingly, the recording of the digital signal along the fifth and sixth slant tracks A5 and A6 remains inhibited. A sequence of these processes is periodically iterated.

During the LP mode of operation, the digital signal is recorded along the slant tracks A1, A4, . . . spaced from each other by two slant tracks and substantially nonoverlapping each other. The effective slant tracks A1, A4, . . . compose a pattern substantially equal to a slant track pattern formed during a standard mode of operation. The LP mode of operation can record a digital signal on a 120-minute tape at a data rate of 14.1/3 Mbps for 240 minutes multiplied by 3.

There is a 1/7-speed LP mode of operation during which a tape drive speed is set to 1/7 times the standard speed, and the recording of a digital signal on a magnetic tape is implemented once in every 7/2 turns (revolutions) of the rotary drum. The 1/7-speed LP mode of operation can record a digital signal on a 120-minute tape at a data rate of 14.1/7 Mbps for 240 minutes multiplied by 7.

A helical-scan VTR has two servo sections, that is, a drum servo section and a capstan servo section, which determine a slant track pattern on a magnetic tape. A frame pulse signal is a reference for the two servo sections. The frame pulse signal is also referred to as the reference signal. The drum servo section controls rotation of a rotary drum. The capstan servo section controls feed of the magnetic tape. The two servo sections respond to the reference signal to implement the following processes for signal recording. One complete turn of the rotary drum occurs for every period of the reference signal. Feed of the magnetic tape by a given distance occurs for every period of the reference signal. A fixed control head records a 1-period-corresponding portion of a control pulse signal on the magnetic tape along a control track for every period of the reference signal.

During a playback mode of operation of the helical-scan VTR, a capstan is controlled so that a 1-period-corresponding portion of the control pulse signal is reproduced from the magnetic tape for every period of the reference signal.

A background-art digital VTR which can implement intermittent recording has servo control circuits for a rotary drum and a magnetic tape respectively. Operation of the servo control circuits, which occurs during the intermittent recording, is unknown.

A conceivable digital VTR has servo control circuits which can operate for standard recording and intermittent recording. During the standard recording, the servo control circuits in the conceivable digital VTR enable the following processes. For every period of a reference signal, one complete turn of a rotary drum occurs, and a 1-period-corresponding portion of a control pulse signal is recorded on a magnetic tape. Also, during the intermittent recording, the servo control circuits in the conceivable digital VTR enable the following processes. For every period of the reference signal, one complete turn of the rotary drum occurs, and a 1-period-corresponding portion of the control pulse signal is recorded on a magnetic tape. In this case, since the control pulse signal has been recorded also during the intermittent recording, it is difficult to discriminate slant tracks caused by the intermittent recording from slant tracks caused by standard recording. For example, the second and sixth slant tracks A2 and A6 in FIG. 1 may be erroneously recognized as effective tracks caused by the intermittent recording. It should be noted that the first and fourth slant tracks A1 and A4 are effective tracks caused by the intermittent recording.

To allow compatible playback, it is necessary that the positions of formed slant tracks on a magnetic tape relative to the recorded position of a control pulse signal are fixed independent of the type of a recording and reproducing apparatus. Accordingly, it is necessary to decide a so-called "X" value. As previously mentioned, during the LP mode of operation of the background-art recording and reproducing apparatus, that is, during the intermittent recording, the magnetic heads scan the magnetic tape even when the digital signal remains unrecorded thereon. Thus, the control pulse signal is recorded on the magnetic tape also when the digital signal is unrecorded thereon. Therefore, during playback, it is difficult to detect effective slant tracks from pulses of the reproduced control pulse signal.

Assemble recording is one of basic processes implemented by a VTR. At a start of the assemble recording, a first new slant track is formed on an editing point, that is, a region of a magnetic tape which immediately follows a last one of existing slant tracks. The difficulty in discriminating slant tracks caused by intermittent recording from slant tracks caused by standard recording raises a problem in the assemble recording. In the case where a sequence of existing slant tracks is not previously known, it is difficult to decide a proper scanning time interval at which the assembled recording should start. Thus, in this case, there is a chance of erroneously erasing one or more of the existing slant tracks. In addition, during playback, it may be difficult to correctly trace the existing slant tracks and the newly formed slant tracks according to the reproduction sequence of the existing slant tracks.

EMBODIMENT OF THE INVENTION

Figure 3:
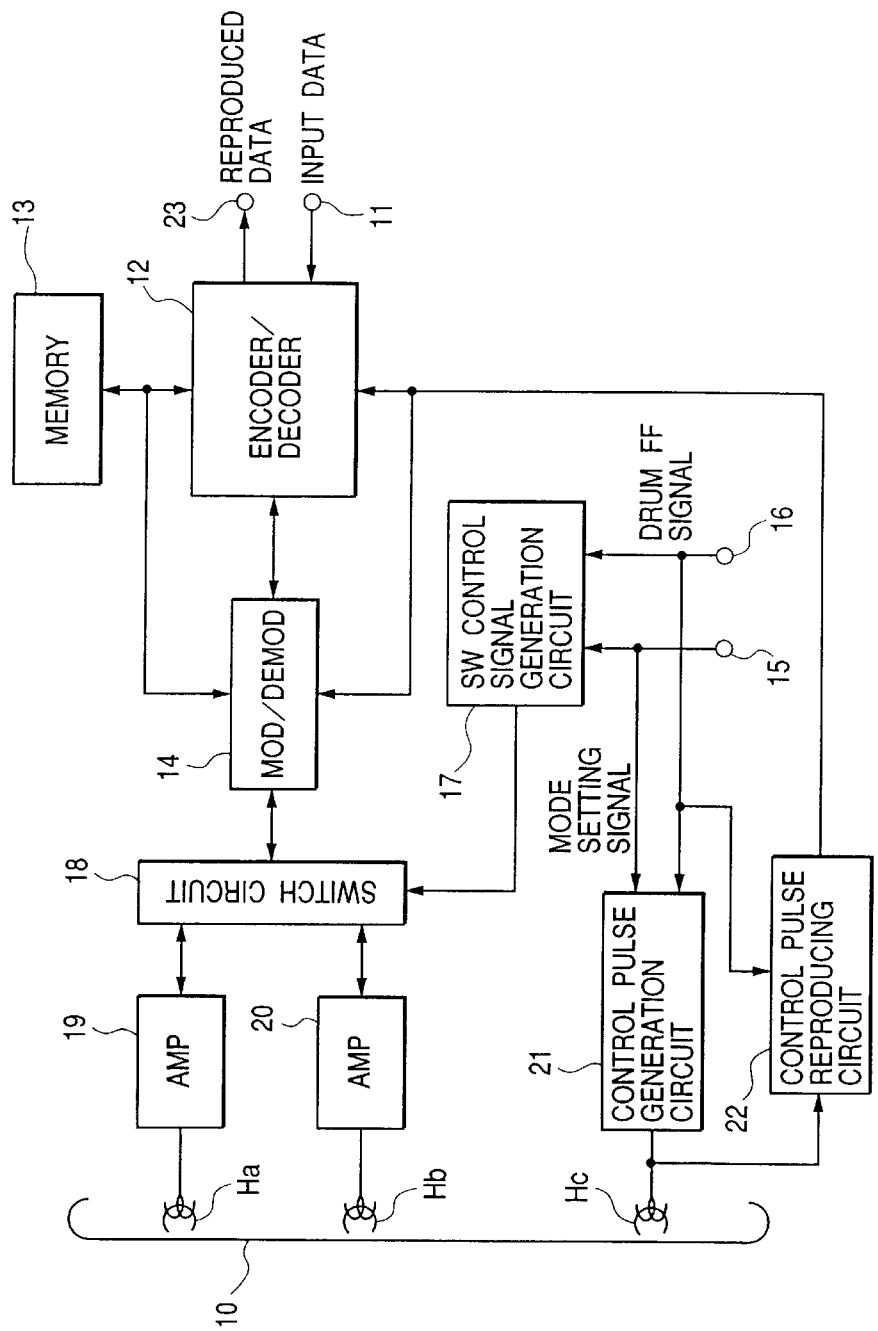
FIG. 3 is a block diagram of a magnetic recording and reproducing apparatus according to an embodiment of this invention.

FIG. 3 shows a magnetic recording and reproducing apparatus according to an embodiment of this invention. The apparatus of FIG. 3 is a combination of a magnetic recording apparatus and a magnetic reproducing apparatus.

The apparatus of FIG. 3 includes magnetic heads Ha, Hb, and Hc. The magnetic heads Ha and Hb are assigned to main information. The magnetic heads Ha and Hb are mounted on the bottom surface of a rotary drum (not shown). The magnetic heads Ha and Hb rotate together with the rotary drum. The magnetic heads Ha and Hb are diametrically opposed to each other. The height positions of the magnetic heads Ha and Hb are equal to each other. The magnetic head Ha has a first predetermined azimuth angle. The magnetic head Hb has a second predetermined azimuth angle different from the first predetermined azimuth angle. The magnetic heads Ha and Hb have gap surfaces which slightly project outward from the outer circumferential surface of the rotary drum. A magnetic tape 10 is wrapped around the outer circumferential surface of the rotary drum along a part of a helix through an angular range of about 180 degrees. A part of the magnetic tape is held between a capstan (not shown) and a roller (not shown) so that the magnetic tape is driven and fed in a given direction referred to as a forward direction.

The magnetic head Hc is assigned to a control pulse signal (control information). The magnetic head He is fixed at a given position separate from the rotary drum.

Operation of the apparatus of FIG. 3 can be changed among different modes including a standard recording mode, a standard playback mode, a long time recording mode, and a long time playback mode. During the standard recording mode and the standard playback mode of operation, the rotary drum is rotated at a predetermined speed. Also during the long time recording mode and the long time playback mode of operation, the rotary drum is rotated at the predetermined speed. In the case where the magnetic heads Ha and Hb alternately scan the magnetic tape 10 along slant tracks at a rate of one track per ⅟₆₀ second during the standard recording mode and the standard playback mode of operation, the rotational speed of the rotary drum is maintained at 30 rps (the predetermined speed). During the standard recording mode and the standard playback mode of operation, the magnetic tape is driven at a predetermined speed referred to as a standard speed. During the long time recording mode and the long time playback mode of operation, the magnetic tape is driven at a speed equal to 1/N times the standard speed. Here, "N" denotes a predetermined integer equal to or greater than "2". Preferably, the predetermined integer "N" is odd. For example, the predetermined integer "N" is equal to "3", "5", "7", "9", or "11". The long time recording mode and the long time playback mode are also referred to as the 1/N-speed recording mode and the 1/N-speed playback mode, respectively.

The drive speed of the magnetic tape 10 is controlled by a known arrangement using the following techniques. A speed detection signal is generated whose frequency is proportional to the rotational speed of a capstan motor. The magnetic tape 10 is subjected to speed control responsive to the speed detection signal. Rotation of the capstan motor is detected so that a capstan rotation detection signal is generated. During a recording mode of operation of the apparatus, phase comparison is implemented between the capstan rotation detection signal and the output signal of an oscillator so that a phase error signal is generated. The capstan motor is subjected to phase control responsive to the phase error signal. During a playback mode of operation of the apparatus, a control pulse signal is reproduced from the magnetic tape 10, and phase comparison is implemented between the capstan rotation detection signal and the reproduced control pulse signal to detect a phase error therebetween. A signal representative of the detected phase error is generated. The capstan motor is subjected to phase control responsive to the phase error signal.

The apparatus of FIG. 3 includes an encoder/decoder circuit 12, a memory 13, a modulation/demodulation circuit 14, a switch control signal generation circuit 17, a switch circuit 18, recording/reproducing amplifiers 19 and 20, a control pulse generation circuit 21, and a control pulse reproducing circuit 22. The encoder/decoder circuit 12 is connected to the memory 13, the modulation/demodulation circuit 14, and the control pulse reproducing circuit 22. The memory 13 is connected to the modulation/demodulation circuit 14. The modulation/demodulation circuit 14 is connected to the switch circuit 18 and the control pulse reproducing circuit 22. The switch control signal generation circuit 17 is connected to the switch circuit 18. The switch circuit 18 is connected to the recording/reproducing amplifiers 19 and 20. The recording/reproducing amplifier 19 is connected to the magnetic head Ha via a rotary transformer (not shown). The recording/reproducing amplifier 20 is connected to the magnetic head Hb via a rotary transformer (not shown). The control pulse generation circuit 21 is connected to the magnetic head Hc. The control pulse reproducing circuit 22 is connected to the magnetic head Hc.

Operation of the apparatus of FIG. 3 in a recording mode is as follows. A digital information signal to be recorded is inputted into the encoder/decoder circuit 12 via a terminal 11. The encoder/decoder circuit 12 subjects the input digital information signal to encoding processes and thereby converts the input digital information signal into encoding-resultant data while using the memory 13. The encoding processes include an interleaving process and an error-correction-code adding process. The encoding-resultant data is stored in the memory 13.

The input digital information signal is composed of, for example, main data and auxiliary data. The main data represents main information. The auxiliary data is referred to as pack data. The pack data has a fixed length (a fixed number of bits), and represents auxiliary information pieces and identification information pieces for the auxiliary information pieces. For example, the auxiliary information pieces are a cassette identification information piece, a time code information piece, a recording date information piece (an information piece of a video program index number and a channel whose digital broadcast signal is recorded), and a text information piece (an information piece of a title of each video program and a summary of the video program).

The modulation/demodulation circuit 14 outputs a clock signal to the memory 13. The encoding-resultant data is read out from the memory 13 in response to the clock signal, and is then fed to the modulation/demodulation circuit 14. The modulation/demodulation circuit 14 subjects the encoding-resultant data to a modulation process for record, and thereby converts the encoding-resultant data into a modulation-resultant digital information signal. The modulation/demodulation circuit 14 outputs the modulation-resultant digital information signal to the switch circuit 18.

The switch circuit 18 receives a switch control signal from the switch control signal generation circuit 17. The switch circuit 18 transmits the modulation-resultant digital information signal to one of the recording/reproducing amplifiers 19 and 20, or inhibits the transmission of the modulation-resultant digital information signal to the recording/reproducing amplifiers 19 and 20 in response to the switch control signal.

The switch control signal generation circuit 17 receives a mode setting signal via a terminal 15. The mode setting signal represents a desired mode of operation of the apparatus which is designated by a user. The mode setting signal is generated in response to operation of a suitable input unit (not shown) by the user. The switch control signal generation circuit 17 receives a head switching pulse signal (a drum flip-flop signal) via a terminal 16. The head switching pulse signal has a symmetrical rectangular waveform with a period corresponding to one turn of the rotary drum. The head switching pulse signal is generated by a known arrangement (not shown) in synchronism with a rotational phase of the rotary drum. The switch control signal generation circuit 17 produces the switch control signal in response to the mode setting signal and the head switching pulse signal.

The switch control signal fed to the switch circuit 18 from the switch control signal generation circuit 17 is designed to enable the following processes. In the case where the desired mode represented by the mode setting signal is the 1/N-speed recording mode, during a time interval corresponding to a half turn of the rotary drum, the switch circuit 18 feeds the modulation-resultant digital information signal to the recording/reproducing amplifier 19 connected to the magnetic head Ha which is currently scanning the magnetic tape 10. The modulation-resultant digital information signal is fed from the recording/reproducing amplifier 19 to the magnetic head Ha via the related rotary transformer, being recorded by the magnetic head Ha on the magnetic tape 10 along a slant track. During a subsequent time interval corresponding to an (N−1)/2 turn or turns of the rotary drum, the switch circuit 18 blocks and inhibits the transmission of the modulation-resultant digital information signal to the recording/reproducing amplifiers 19 and 20. Thus, the modulation-resultant digital information signal remains unrecorded. During a following time interval corresponding to a half turn of the rotary drum, the switch circuit 18 feeds the modulation-resultant digital information signal to the recording/reproducing amplifier 20 connected to the magnetic head Hb which is currently scanning the magnetic tape 10. The modulation-resultant digital information signal is fed from the recording/reproducing amplifier 20 to the magnetic head Hb via the related rotary transformer, being recorded by the magnetic head Hb on the magnetic tape 10 along a slant track. The above-mentioned steps are iterated. In this case, the switch control signal has a period corresponding to N/2 turns of the rotary drum. As understood from the above explanation, when the desired mode is the 1/N-speed recording mode, the apparatus of FIG. 3 implements intermittent recording. The digital information signal recorded on the magnetic tape 10 has a sequence of data blocks having equal sizes. A predetermined number of data blocks are assigned to each of the slant tracks on the magnetic tape 10.

Figure 4:
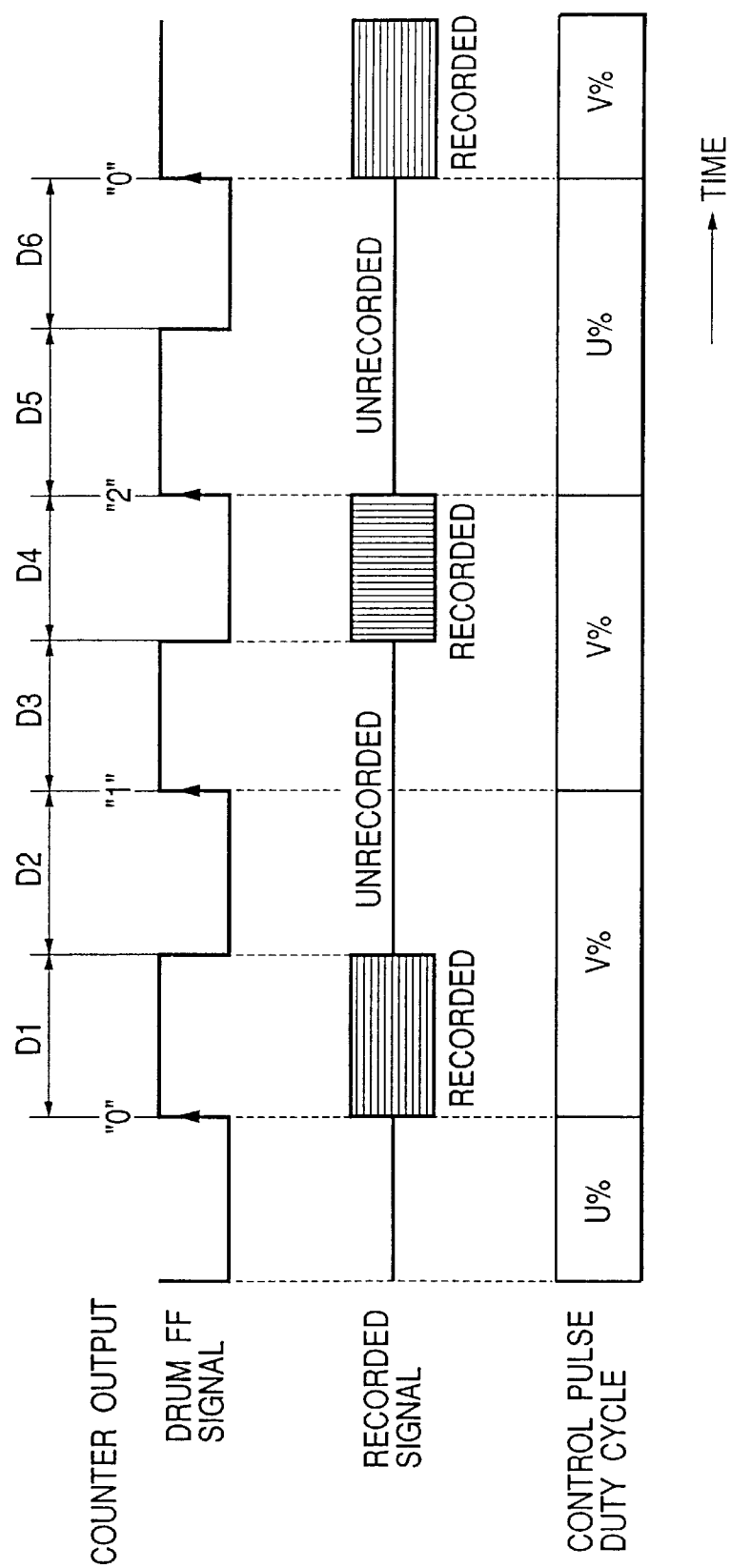
FIG. 4 is a time-domain diagram of a counter output signal, a drum flip-flop signal, a duty cycle of a control pulse signal, and a main signal recorded on a magnetic tape in a 1/3-speed recording mode of operation of the apparatus in FIG. 3.

With reference to FIG. 4, an explanation will be given of the case where the desired mode represented by the mode setting signal is the 1/3-speed recording mode, that is, the case where the predetermined integer "N" is equal to "3". The drum flip-flop signal (the head switching pulse signal) is in a high-level state during first alternate half turns of the rotary drum, that is, during first alternate time intervals D1, D3, D5, . . . . The drum flip-flop signal (the head switching pulse signal) is in a low-level state during second alternate half turns of the rotary drum, that is, during second alternate time intervals D2, D4, D6, . . . . During the time interval D1 corresponding to a half turn of the rotary drum, the switch circuit 18 feeds the modulation-resultant digital information signal to the recording/reproducing amplifier 19 connected to the magnetic head Ha which is currently scanning the magnetic tape 10. The modulation-resultant digital information signal is fed from the recording/reproducing amplifier 19 to the magnetic head Ha via the related rotary transformer, being recorded by the magnetic head Ha on the magnetic tape 10 along a slant track. During a subsequent time interval D2+D3 corresponding to one turn of the rotary drum, the switch circuit 18 blocks and inhibits the transmission of the modulation-resultant digital information signal to the recording/reproducing amplifiers 19 and 20. Thus, the modulation-resultant digital information signal remains unrecorded. During the following time interval D4 corresponding to a half turn of the rotary drum, the switch circuit 18 feeds the modulation-resultant digital information signal to the recording/reproducing amplifier 20 connected to the magnetic head Hb which is currently scanning the magnetic tape 10. The modulation-resultant digital information signal is fed from the recording/reproducing amplifier to the magnetic head Hb via the related rotary transformer, being recorded by the magnetic head Hb on the magnetic tape 10 along a slant track. The above-mentioned steps are iterated. In this case, a resultant track pattern formed on the magnetic tape 10 is similar to that shown in FIG. 1.

The control pulse generation circuit 21 receives the mode setting signal via the terminal 15. The control pulse generation circuit 21 receives the drum flip-flop signal (the head switching pulse signal) via the terminal 16. The control pulse generation circuit 21 produces a control pulse signal in response to the mode setting signal and the drum flip-flop signal. The control pulse generation circuit 21 outputs the control pulse signal to the magnetic head Hc. The control pulse signal is recorded by the magnetic head Hc on the magnetic tape 10 along a control track extending longitudinally with respect to the magnetic tape 10.

For example, the control pulse generation circuit 21 includes a signal processor, a microcomputer, or a similar device which operates in accordance with a control program stored therein.

Figure 5:
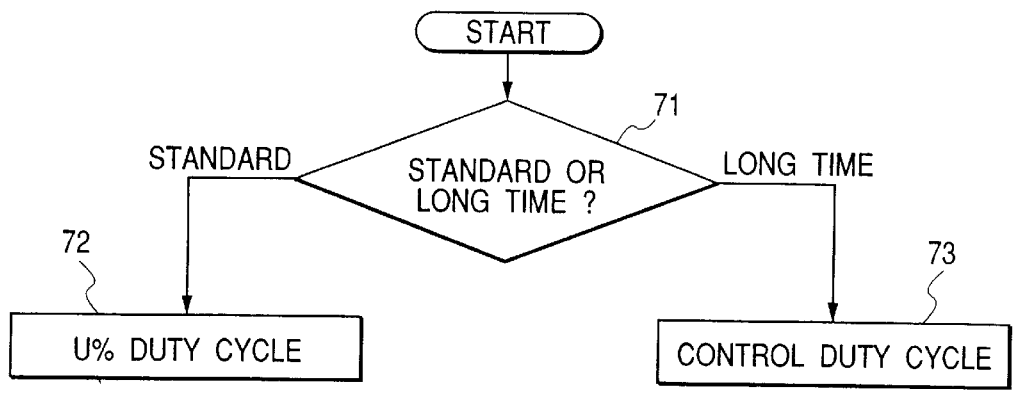
FIG. 5 is a flowchart of a segment of a control program for a control pulse generation circuit in FIG. 3.

FIG. 5 is a flowchart of a segment of the control program for the control pulse generation circuit 21. As shown in FIG. 5, a first step 71 decides whether the desired mode represented by the mode setting signal is the standard recording mode or the long time recording mode. When the desired mode represented by the mode setting signal is the standard recording mode, the program advances from the step 71 to a block 72. When the desired mode represented by the mode setting signal is the long time recording mode, the program advances from the step 71 to a block 73. The block 72 implements a process of generating and outputting a control pulse of a predetermined U-% duty cycle during every turn of the rotary drum. Accordingly, during the standard recording mode of operation of the apparatus, a control pulse signal having the U-% duty cycle continues to be recorded by the magnetic head Hc on the magnetic tape 10 along a control track extending longitudinally with respect to the magnetic tape 10. Here, "U" denotes a given value smaller than "100". The program exits from the block 72 when operation of the apparatus is required to move out of the standard recording mode. The block 73 implements a process of generating and outputting a control pulse signal having a periodically-changing duty cycle. The program exits from the block 73 when operation of the apparatus is required to move out of the long time recording mode.

Figure 6:
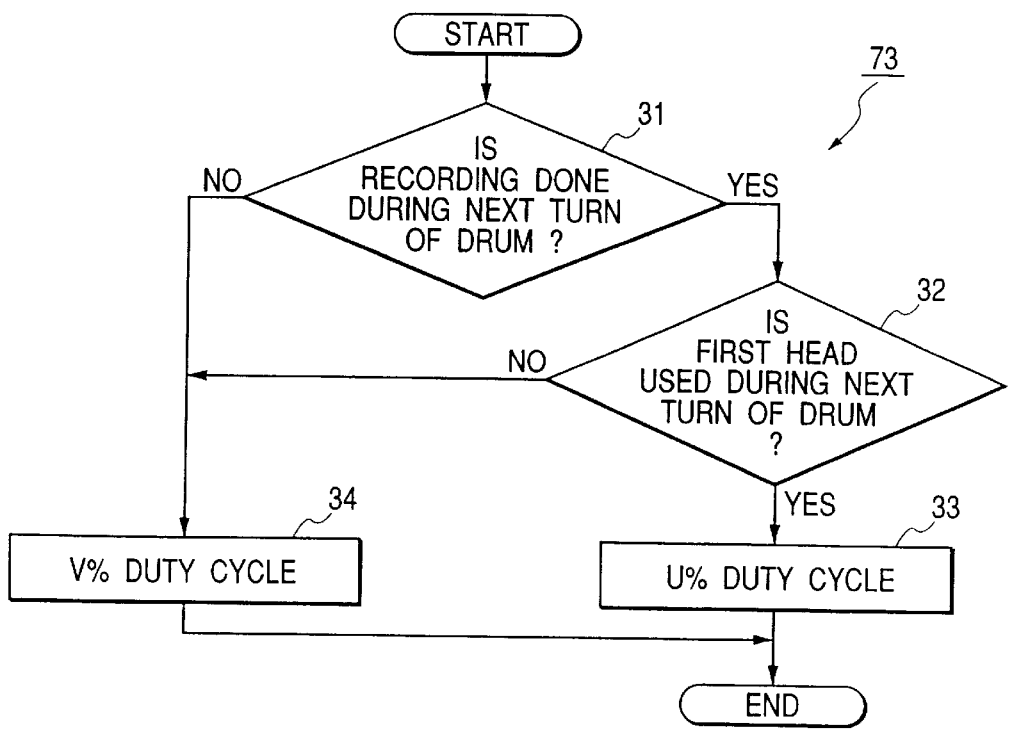
FIG. 6 is a flowchart of a segment of a block in FIG. 5.

FIG. 6 is a flowchart of a segment of the block 73 which is executed for every turn of the rotary drum during the long time recording mode of operation of the apparatus. As shown in FIG. 6, a first step 31 of the block segment decides, in response to the mode setting signal and the drum flip-flop signal, whether the recording of the modulation-resultant digital information signal should be implemented or inhibited during a next turn of the rotary drum. If it is decided that the recording of the modulation-resultant digital information signal should be implemented during the next turn of the rotary drum, the program advances from the step 31 to a step 32. If it is decided that the recording of the modulation-resultant digital information signal should be inhibited during the next turn of the rotary drum, the program advances from the step 31 to a step 34.

The step 32 decides, in response to the polarity of the drum flip-flop signal, whether the magnetic head Ha or the magnetic head Hb should be used for signal recording during the next turn of the rotary drum. In other words, the step 32 decides whether or not the magnetic head which should be used for signal recording during the next turn of the rotary drum is the magnetic head Ha having the first predetermined azimuth angle. If it is decided that the magnetic head Ha should be used for signal recording during the next turn of the rotary drum, that is, if it is decided that the magnetic head which should be used for signal recording during the next turn of the rotary drum is the magnetic head Ha having the first predetermined azimuth angle, the program advances from the step 32 to a step 33. Otherwise, the program advances from the step 32 to the step 34.

The step 33 implements a process of outputting a control pulse signal having a predetermined U-% duty cycle during the present turn of the rotary drum. In this case, during the present turn of the rotary drum, the control pulse signal having the U-% duty cycle is recorded by the magnetic head Hc on the magnetic tape 10 along a control track extending longitudinally with respect to the magnetic tape 10. Here, "U" denotes a given value smaller than "100". After the step 33, the current execution cycle of the block segment ends.

The step 34 implements a process of outputting a control pulse signal having a predetermined V-% duty cycle during the present turn of the rotary drum. In this case, during the present turn of the rotary drum, the control pulse signal having the V-% duty cycle is recorded by the magnetic head Hc on the magnetic tape 10 along a control track extending longitudinally with respect to the magnetic tape 10. Here, "V" denotes a given value smaller than "100" and different from the value "U". After the step 34, the current execution cycle of the block segment ends.

In the case where the desired mode represented by the mode setting signal is the 1/3-speed recording mode (that is, the case where the predetermined integer "N" is equal to "3"), the control pulse signal outputted from the control pulse generation circuit 21 and recorded on the magnetic tape 10 periodically changes in duty cycle as follows. With reference to FIG. 4, during a time interval D1+D2 corresponding to one turn of the rotary drum, the modulation-resultant digital information signal is recorded on the magnetic tape 10 by the magnetic head Ha. Accordingly, during a time interval corresponding to one turn of the rotary drum and immediately preceding the time interval D1+D2, the duty cycle of the control pulse signal is equal to U%. During a next time interval D3+D4 corresponding to one turn of the rotary drum, the modulation-resultant digital information signal is recorded on the magnetic tape 10 by the magnetic head Hb. Accordingly, during the time interval D1+D2 corresponding to one turn of the rotary drum and immediately preceding the time interval D3+D4, the duty cycle of the control pulse signal is equal to V%. During a subsequent time interval D5+D6 corresponding to one turn of the rotary drum, the modulation-resultant digital information signal remains unrecorded. Accordingly, during the time interval D3+D4 corresponding to one turn of the rotary drum and immediately preceding the time interval D5+D6, the duty cycle of the control pulse signal is equal to V%. During a next time interval D7+D8 corresponding to one turn of the rotary drum, the modulation-resultant digital information signal is recorded on the magnetic tape 10 by the magnetic head Ha. Accordingly, during the time interval D5+D6 corresponding to one turn of the rotary drum and immediately preceding the time interval D7+D8, the duty cycle of the control pulse signal is equal to U%.

The control pulse generation circuit 21 applies a known technique to changing the duty cycle of the control pulse signal. Such a technique is used in recording, for example, a signal of a user time code, VASS, or VISS.

During an initial stage of operation of the apparatus of FIG. 3 in a playback mode, the magnetic head Hc scans a control track on a magnetic tape 10, and reproduces a control pulse signal therefrom. The magnetic head Hc feeds the reproduced control pulse signal to the control pulse reproducing circuit 22. The control pulse reproducing circuit 22 detects the duty cycle of the reproduced control pulse signal. The control pulse reproducing circuit 22 decides a recording mode related to main information on the magnetic tape 10 in response to the detected duty cycle of the reproduced control pulse signal. Specifically, the control pulse reproducing circuit 22 decides whether main information on slant tracks of the magnetic tape 10 is caused by the standard recording mode or the 1/N-speed recording mode (the long time recording mode) in response to the detected duty cycle of the reproduced control pulse signal. In the case where the control pulse reproducing circuit 22 decides that the main information on the slant tracks of the magnetic tape 10 is caused by the standard recording mode, operation of the apparatus is set in the standard playback mode. In the case where the control pulse reproducing circuit 22 decides that the main information on the slant tracks of the magnetic tape 10 is caused by the 1/N-speed recording mode (the long time recording mode), operation of the apparatus is set in the 1/N-speed playback mode (the long time playback mode).

After the previously-mentioned initial stage, operation of the apparatus of FIG. 3 in a playback mode is as follows. The capstan motor is rotated at a speed equal to that used in the decided recording mode which causes the main information on the slant tracks of the magnetic tape 10. Thus, the magnetic tape 10 is driven at a speed equal to that used in the decided recording mode. The magnetic heads Ha and Hb alternately scan the slant tracks on the magnetic tape 10, and reproduce digital information signals therefrom. The digital information signal reproduced by the magnetic head Ha is transmitted to the switch circuit 18 via the related rotary transformer and the recording/reproducing amplifier 19. The digital information signal reproduced by the magnetic head Hb is transmitted to the switch circuit 18 via the related rotary transformer and the recording/reproducing amplifier 20.

The switch circuit 18 receives a switch control signal from the switch control signal generation circuit 17. Basically, the switch circuit 18 selects one of the output signals of the recording/reproducing amplifiers 19 and 20, that is, one of the signal reproduced by the magnetic head Ha and the signal reproduced by the magnetic head Hb in response to the switch control signal. The switch control circuit 18 transmits the selected signal to the modulation/demodulation circuit 14 as a reproduced digital information signal.

The switch control signal fed to the switch circuit 18 from the switch control signal generation circuit 17 is designed to enable the following processes. In the case where the magnetic head Ha is currently scanning an effective slant track on the magnetic tape 10, the switch circuit 18 selects the output signal of the recording/reproducing amplifier 19 (that is, the signal reproduced by the magnetic head Ha). In the case where the magnetic head Hb is currently scanning an effective slant track on the magnetic tape 10, the switch circuit 18 selects the output signal of the recording/reproducing amplifier 20 (that is, the signal reproduced by the magnetic head Hb).

The modulation/demodulation circuit 14 subjects the reproduced digital information signal (the output signal of the switch circuit 18) to a demodulation process, and thereby converts the reproduced digital information signal into a demodulation-resultant digital information signal. The modulation/demodulation circuit 14 stores the demodulation-resultant digital information signal into the memory 13.

The encoder/decoder circuit 12 reads out the demodulation-resultant digital information signal from the memory 13. The encoder/decoder circuit 12 subjects the demodulation-resultant digital information signal to decoding processes and thereby converts the demodulation-resultant digital information signal into decoding-resultant data (recovered original data) while using the memory 13. The decoding processes include a de-interleaving process and an error correction process. The encoder/decoder circuit 12 outputs the recovered original data to a terminal 23 as reproduced data.

Figure 7:
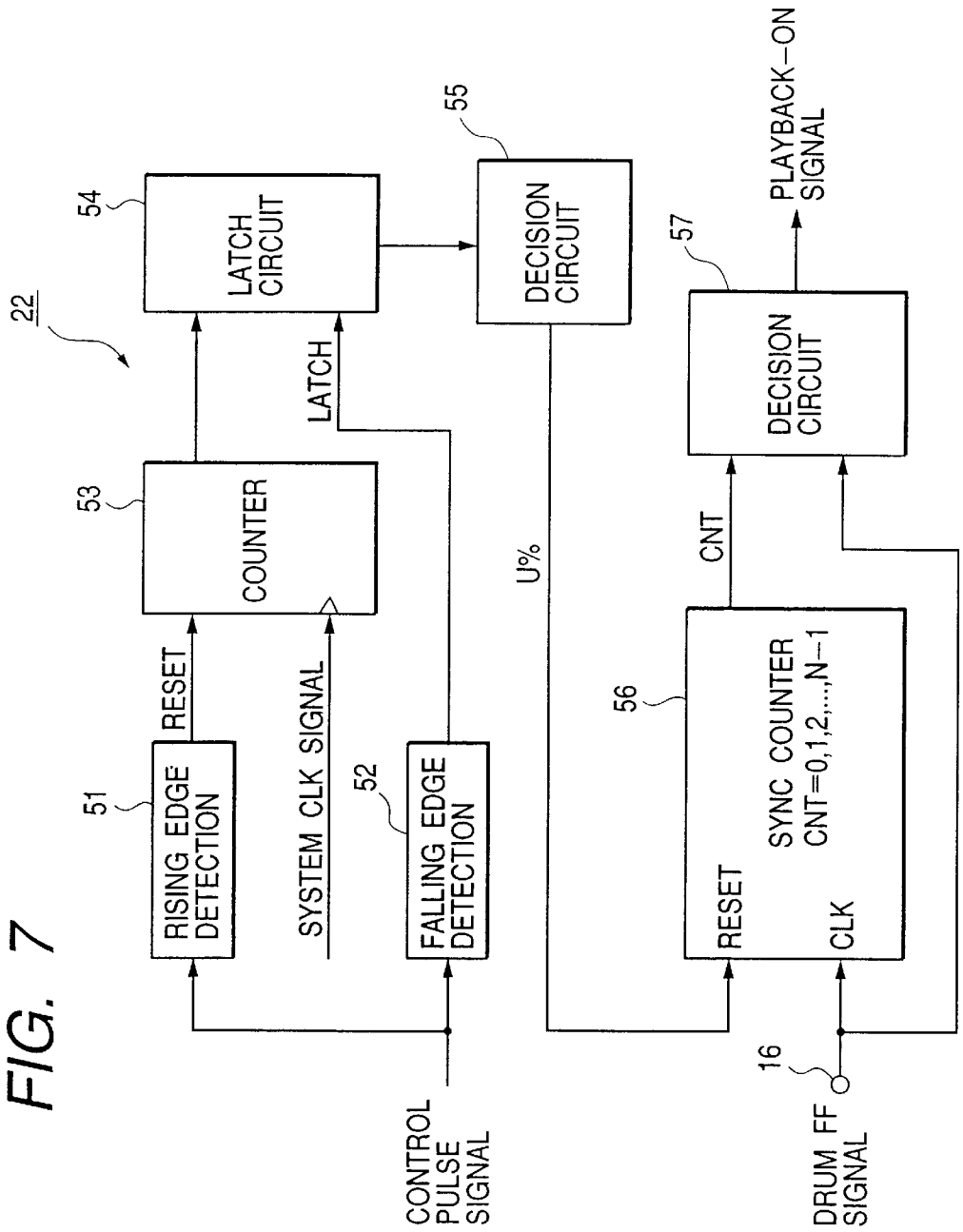
FIG. 7 is a block diagram of a control pulse reproducing circuit in FIG. 3.

As shown in FIG. 7, the control pulse reproducing circuit 22 includes a rising edge detection circuit 51, a falling edge detection circuit 52, a counter 53, a latch circuit 54, a decision circuit 55, a synchronous counter 56, and a decision circuit 57. The rising edge detection circuit 51 and the falling edge detection circuit 52 receive the reproduced control pulse signal from the magnetic head Hc via a waveform shaping circuit (not shown). The counter 53 receives a system clock signal from a suitable clock signal generator (not shown). The synchronous counter 56 and the decision circuit 57 receive the drum flip-flop signal via the terminal 16. The rising edge detection circuit 51 is connected to the counter 53. The counter 53 is connected to the latch circuit 54. The falling edge detection circuit 52 is connected to the latch circuit 54. The latch circuit 54 is connected to the decision circuit 55. The decision circuit 55 is connected to the synchronous counter 56. The synchronous counter 56 is connected to the decision circuit 57. The decision circuit 57 is connected to the encoder/decoder circuit 12 and the modulation/demodulation circuit 14.

The rising edge detection circuit 51 senses every rising edge in the reproduced control pulse signal. The rising edge detection circuit 51 outputs a resetting signal to the counter 53 in response to the sensed rising edge in the control pulse signal. The system clock signal applied to the counter 53 has a predetermined frequency significantly higher than a frequency of the control pulse signal. The frequency of the system clock signal is equal to, for example, 3.58 MHz or 16 MHz. On the other hand, the frequency of the control pulse signal is equal to, for example, 30 Hz. The counter 53 counts pulses of the system clock signal. The counter 53 is reset by the resetting signal fed from the rising edge detection circuit 51. The counter 53 outputs a signal to the latch circuit 54 which represents the number of counted pulses. The falling edge detection circuit 52 senses every falling edge in the reproduced control pulse signal. The falling edge detection circuit 52 outputs a latching signal to the latch circuit 54 in response to the sensed falling edge in the control pulse signal. The latch circuit 54 latches the output signal of the counter 53 in response to the latching signal fed from the falling edge detection circuit 52. Accordingly, the output signal of the counter 53 which is latched by the latch circuit 54 represents a counted pulse number proportional to the time interval between the moment of the occurrence of the rising edge (the leading edge) in the control pulse signal and the moment of the occurrence of the subsequent falling edge (the subsequent trailing edge) therein. The latch circuit 54 outputs the latched signal to the decision circuit 55. In other words, the latch circuit 54 informs the decision circuit 55 of the counted pulse number.

The decision circuit 55 divides the counted pulse number by a predetermined number corresponding to one period of the control pulse signal. Thus, the decision circuit 55 calculates the duty cycle of the control pulse signal for every period of the control pulse signal. The decision circuit 55 determines whether or not the calculated duty cycle is substantially equal to a duty cycle of U%. When it is determined that the calculated duty cycle is substantially equal to a duty cycle of U%, the decision circuit 55 outputs a reset enabling signal to the synchronous counter 56. Otherwise, the decision circuit 55 outputs a reset inhibiting signal to the synchronous counter 56.

In general, the decision circuit 55 informs a system controller (not shown) of the calculated duty cycle as a detected duty cycle of the reproduced control pulse signal.

The synchronous counter 56 functions to count up rising edges in the drum flip-flop signal. In the case where the synchronous counter 56 receives the reset enabling signal from the decision circuit 55, an output signal of the synchronous counter 56 is reset to "0" when a rising edge occurs in the drum flip-flop signal. In the case where the synchronous counter 56 receives the reset inhibiting signal from the decision circuit 55, the output signal of the synchronous counter 56 is incremented by "1" when a rising edge occurs in the drum flip-flop signal. During the 1/N-speed playback mode (the long time playback mode) of operation of the apparatus, the value represented by the output signal of the synchronous counter 56 periodically and cyclically changes as "0→1→2→ . . . →N−1→0→1→2→ . . . ". Specifically, during the 1/3-speed playback mode of operation of the apparatus, the value represented by the output signal of the synchronous counter 56 periodically and cyclically changes as "0→1→2→0→1→2→ . . . " (see FIG. 4). On the other hand, during the standard playback mode of operation of the apparatus, the value represented by the output signal of the synchronous counter 56 remains equal to "0". The output signal of the synchronous counter 56 is applied to the decision circuit 57.

The decision circuit 57 generates a playback-on control signal in response to the output signal of the synchronous counter 56 and the drum flip-flop signal. In the case where the apparatus of FIG. 3 operates in the 1/N-speed playback mode, the playback-on control signal is in a first logic state when the value represented by the output signal of the synchronous counter 56 is equal to "0" and the drum flip-flop signal is in its high-level state, or when the value represented by the output signal of the synchronous counter 56 is equal to "(N−1)/2" and the drum flip-flop signal is in its low-level state. Otherwise, the playback-on control signal is in a second logic state different from the first logic state. In the case where the apparatus of FIG. 3 operates in the standard playback mode, the playback-on control signal continues to be in its first logic state. With reference to FIG.

4, in the case where the apparatus of FIG. 3 operates in the 1/3-speed playback mode, the playback-on control signal is in its first logic state during the time intervals D1, D4, D7, . . . . The playback-on control signal is in its second logic state during the other time intervals.

Accordingly, the playback-on control signal represents every time interval during which an effective reproduced signal is outputted from the magnetic head Ha or Hb. The decision circuit 57 outputs the playback-on control signal to the encoder/decoder circuit 12 and the modulation/demodulation circuit 14. The playback-on control signal is used by the encoder/decoder circuit 12 to selectively enable the decoding processes. The playback-on control signal is used by the modulation/demodulation circuit 14 to selectively enable the demodulation process.

It should be noted that a portion of the control pulse reproducing circuit 22 up to the decision circuit 55 may be formed by a microcomputer programmed to implement processes corresponding to operation of the rising edge detection circuit 51, the falling edge detection circuit 52, the counter 53, the latch circuit 54, and the decision circuit 55.

As previously mentioned, during a playback mode of operation of the apparatus, the control pulse reproducing circuit 22 detects the duty cycle of a reproduced control pulse signal. The control pulse reproducing circuit 22 decides whether main information on slant tracks of a magnetic tape 10 is caused by the standard recording mode or the 1/N-speed recording mode (the long time recording mode) in response to the detected duty cycle of the reproduced control pulse signal. Accordingly, during a playback mode of operation of the apparatus, it is possible to decide a recording track sequence related to main information on slant tracks of a magnetic tape 10. Thus, it is possible to implement assemble recording in which the recording track sequence same as the decided recording track sequence is maintained and a control pulse signal having the duty cycle same as that used in the last recording is recorded. In other words, continuity in the recording track sequence can be maintained regarding the assemble recording.

During operation of the apparatus of FIG. 3 in the 1/N-speed playback mode, it is decided that a first time interval corresponding to a half turn of the rotary drum, which occurs immediately after the detected duty cycle of a reproduced control pulse signal is equal to U%, is a scanning period where the magnetic head Ha records main information on a magnetic tape 10. Furthermore, it is decided that a second time interval corresponding to a half turn of the rotary drum and following the first time interval by N scanning periods is a scanning period where the magnetic head Hb records the main information on the magnetic tape 10. Thus, it is possible to determine whether main information on slant tracks of a magnetic tape 10 is caused by the standard recording mode or the 1/N-speed recording mode (the long time recording mode) in response to the detected duty cycle of the reproduced control pulse signal.

Accordingly, a playback track sequence can be set into correspondence with the recording track sequence related to the main information on the slant tracks of the magnetic tape 10.

Regardless of whether the apparatus of FIG. 3 operates in the standard recording mode or the long time recording mode (the 1/N-speed recording mode), a 1-period-corresponding portion of the control pulse signal is recorded by the magnetic head Hc on a magnetic tape 10 during every turn of the rotary drum. As previously mentioned, the duty cycle of the recorded control pulse signal depends on whether the apparatus of FIG. 3 operates in the standard recording mode or the long time recording mode (the 1/N-speed recording mode). Thus, during a playback mode of operation of the apparatus, it is possible to decide whether main information on slant tracks of a magnetic tape 10 is caused by the standard recording mode or the long time recording mode (the 1/N-speed recording mode) in response to the detected duty cycle of the reproduced control pulse signal. Same control servo arrangements can be used in the standard recording mode, the long time recording mode (the 1/N-speed recording mode), the standard playback mode, and the long time playback mode (the 1/N-speed playback mode). In addition, same control servo arrangements and a reference signal having a same frequency can be used in the 1/3-speed mode, the 1/5-speed mode, or other long time modes.

It is preferable that a frequency factor of a frequency generator connected to the capstan motor in a capstan speed control circuit is changed depending on an operation mode. The change of the frequency factor of the frequency generator can be implemented by a known technique used in an analog VTR of a helical scan type. The "X" value can be decided by reproducing and analyzing a control pulse signal having a duty cycle of U%. During the decision of the "X" value, adjustment is executed by operating a variable resistor while a related signal waveform is observed by an oscilloscope.

As a preliminary process for the assemble recording, a control pulse signal is reproduced from a portion of a magnetic tape 10 which immediately precedes a designated editing point, and the duty cycle of the reproduced control signal is detected. A decision is made as to whether main information on slant tracks of the magnetic tape 10 is caused by the standard recording mode or the long time recording mode (the 1/N-speed recording mode) in response to the detected duty cycle of the reproduced control pulse signal. Then, the assemble recording of a new digital information signal is implemented while the recording track sequence same as the decided recording track sequence is maintained.

A system controller (not shown) functions to control the encoder/decoder circuit 12, the modulation/demodulation circuit 14, the recording/reproducing amplifiers 19 and 20, and other circuits and devices to change the mode of operation of the apparatus of FIG. 3. The system controller is connected to an input unit (an operation unit) which can be accessed by the user. The mode of operation of the apparatus can be designated by actuation of the input unit. The system controller includes a microcomputer which operates in accordance with a control program stored therein. The system controller is programmed to generate the mode setting signal in response to operation of the input unit by the user. The system controller outputs the mode setting signal to the switch control signal generation circuit 17 and the control pulse generation circuit 21.

Figure 8:
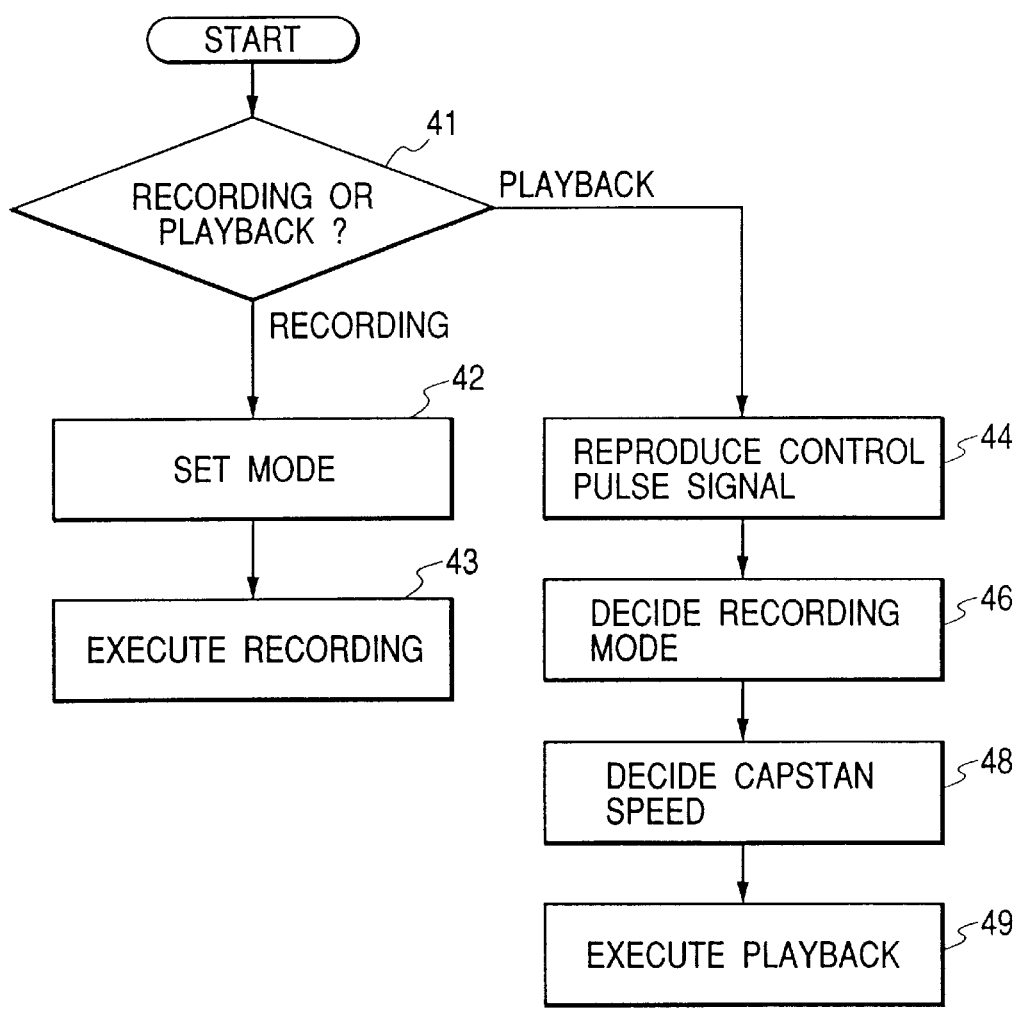
FIG. 8 is a flowchart of a segment of a control program for a system controller.

FIG. 8 is a flowchart of the control program for the microcomputer in the system controller. As shown in FIG. 8, a first step 41 of the control program decides whether recording or playback is requested in response to an output signal of the input unit. When recording is requested, the program advances from the step 41 to a step 42. When playback is requested, the program advances from the step 41 to a step 44.

The step 42 detects which recording mode is requested in response to the output signal of the input unit. The step 42 is followed by a step 43 which executes the requested recording mode of operation. The step 43 generates the mode setting signal in accordance with the requested recording mode. The step 43 outputs the mode setting signal to the switch control signal generation circuit 17 and the control pulse generation circuit 21.

The step 44 drives a magnetic tape 10 at a predetermined constant speed. At the same time, the step 44 enables a control pulse signal to be reproduced from the magnetic tape 10 by the magnetic head Hc. As previously mentioned, the reproduced control pulse signal is fed from the magnetic head Hc to the control pulse reproducing circuit 22. The duty cycle of the reproduced control pulse signal is detected by the control pulse reproducing circuit 22.

A step 46 following the step 44 receives information of the detected duty cycle of the reproduced control pulse signal from the control pulse reproducing circuit 22. The step 46 decides a recording mode related to main information on slant tracks of the magnetic tape 10 on the basis of the detected duty cycle by referring to a predetermined table indicating the relation between the recording mode and the duty cycle.

A step 48 subsequent to the step 46 decides the rotational speed of the capstan motor which has been used in the decided recording mode. The step 48 sets a playback rotational speed of the capstan motor equal to the decided rotational speed of the capstan motor which has been used in the decided recording mode. Accordingly, a playback drive speed of the magnetic tape 10 is set equal to the decided drive speed of the magnetic tape 10 which has been used in the decided recording mode.

A step 49 following the step 48 implements a playback mode of operation which corresponds to the decided recording mode related to the main information on the magnetic tape 10. During the playback mode of operation, the capstan motor is rotated at the playback speed set by the step 48. Thus, the magnetic tape 10 is driven at the playback speed given by the step 48.

What is claimed is:

1. A magnetic recording apparatus having a rotary drum and being able to operate in a long time recording mode, the apparatus comprising:

first and second magnetic heads provided on the rotary drum and alternately scanning a magnetic tape, the first and second magnetic heads being different from each other in azimuth angle;

first means for feeding a digital information signal to the first magnetic head and enabling the digital information signal to be recorded on the magnetic tape via the first magnetic head while the first magnetic head is scanning the magnetic tape in the long time recording mode of operation where the magnetic tape is driven at a speed equal to a predetermined standard speed multiplied by 1/N, and N denotes a predetermined integer equal to or greater than 2;

second means for feeding the digital information signal to the second magnetic head and enabling the digital information signal to be recorded on the magnetic tape via the second magnetic head while the second magnetic head is scanning the magnetic tape in the long time recording mode of operation;

third means for, in the long time recording mode of operation, inhibiting the feed of the digital information signal to the first magnetic head and the second magnetic head by the first means and the second means during an (N-1)/2 turn of the rotary drum after either the feed of the digital information signal to the first magnetic head by the first means or the feed of the digital information signal to the second magnetic head by the second means;

a third magnetic head being fixed and scanning the magnetic tape; and fourth means for generating a control pulse signal, and feeding the generated control pulse signal to the third magnetic head and enabling the generated control pulse signal to be recorded on the magnetic tape via the third magnetic head, the generated control pulse signal having a period corresponding to one turn of the rotary drum, the generated control pulse signal having a duty cycle depending on timings at which the first and second magnetic heads record the digital information signal on the magnetic tape.

2. A magnetic recording apparatus as recited in claim 1, wherein the fourth means comprises means for setting the duty cycle of the control pulse signal to a first predetermined value during one turn of the rotary drum immediately before the first magnetic head scans the magnetic tape and the digital information signal is fed to the first magnetic head by the first means, and means for setting the duty cycle of the control pulse signal to a second predetermined value during other time intervals, the second predetermined value being different from the first predetermined value.

3. A magnetic recording apparatus as recited in claim 1, further comprising:

fifth means for reproducing the control pulse signal from the magnetic tape via the third magnetic head;

sixth means for detecting a duty cycle of the reproduced control pulse signal;

seventh means for deciding a recording track sequence on the basis of the detected duty cycle; and eighth means for implementing assemble recording on the magnetic tape via the first and second magnetic heads while maintaining the decided recording track sequence.

4. An apparatus for reproducing a digital information signal from a magnetic tape in a long time playback mode of operation, the apparatus having a rotary drum and generating a drum pulse signal synchronous with rotation of the rotary drum, the magnetic tape storing a control pulse signal having a period corresponding to one turn of the rotary drum, the control pulse signal having a duty cycle depending on timings at which two magnetic heads of different azimuths record the digital information signal on the magnetic tape, the apparatus comprising:

first and second magnetic heads provided on the rotary drum and alternately scanning the magnetic tape to reproduce the digital information signal therefrom, the first and second magnetic heads being different from each other in azimuth angle;

first means for reproducing the control pulse signal from the magnetic tape;

second means for detecting the duty cycle of the control pulse signal reproduced by the first means;

third means for deciding time intervals during which the digital information signal is effectively reproduced from the magnetic tape by the first and second magnetic heads in response to the duty cycle detected by the second means and the drum pulse signal, and for generating a reproduction control signal representing the decided time intervals;

a reproducing circuit for processing output signals of the first and second magnetic heads; and fourth means for controlling the reproducing circuit in response to the reproduction control signal generated by the third means.

5. An apparatus as recited in claim 4, wherein the third means comprises:

first sub means for deciding whether or not the detected duty cycle corresponds to the first magnetic head;

a synchronous counter for counting up every leading edge in the drum pulse signal in cases where the first sub means decides that the detected duty cycle does not correspond to the first magnetic head, the synchronous counter being reset by a leading edge in the drum pulse signal in cases where the first sub means decides that the detected duty cycle corresponds to the first magnetic head; and second sub means for generating the reproduction control signal in response to an output signal of the synchronous counter and the drum pulse signal.

6. A method of magnetic recording in modes of operation which include a long time recording mode of operation, the method comprising the steps of:

1) feeding a digital information signal to a first magnetic head and enabling the digital information signal to be recorded on a magnetic tape via the first magnetic head while the first magnetic head is scanning the magnetic tape in the long time recording mode of operation where the magnetic tape is driven at a speed equal to a predetermined standard speed multiplied by 1/N, and N denotes a predetermined integer equal to or greater than 2;

2) feeding the digital information signal to a second magnetic head and enabling the digital information signal to be recorded on the magnetic tape via the second magnetic head while the second magnetic head is scanning the magnetic tape in the long time recording mode of operation, wherein the first and second magnetic heads are provided on a rotary drum and alternately scan the magnetic tape, and the first and second magnetic heads are different from each other in azimuth angle;

3) in the long time recording mode of operation, inhibiting the feed of the digital information signal to the first magnetic head and the second magnetic head by the step 1) and the step 2) during an (N−1)/2 turn of the rotary drum after either the feed of the digital information signal to the first magnetic head by the step 1) or the feed of the digital information signal to the second magnetic head by the step 2); and 4) generating a control pulse signal, and feeding the generated control pulse signal to a third magnetic head and enabling the generated control pulse signal to be recorded on the magnetic tape via the third magnetic head, the third magnetic tape being fixed and scanning the magnetic tape, the generated control pulse signal having a period corresponding to one turn of the rotary drum, the generated control pulse signal having a duty cycle depending on timings at which the first and second magnetic heads record the digital information signal on the magnetic tape.

7. A method of reproducing a digital information signal from a magnetic tape in a long time playback mode of operation, the method generating a drum pulse signal synchronous with rotation of a rotary drum, the magnetic tape storing a control pulse signal having a period corresponding to one turn of the rotary drum, the control pulse signal having a duty cycle depending on timings at which two magnetic heads of different azimuths record the digital information signal on the magnetic tape, the method comprising the steps of:

1) reproducing the control pulse signal from the magnetic tape;

2) detecting the duty cycle of the control pulse signal reproduced by the step 1);

3) deciding time intervals during which the digital information signal is effectively reproduced from the magnetic tape by first and second magnetic heads in response to the duty cycle detected by the step 2) and the drum pulse signal, and generating a reproduction control signal representing the decided time intervals, wherein the first and second magnetic heads are provided on the rotary drum and alternately scan the magnetic tape to reproduce the digital information signal therefrom, and the first and second magnetic heads are different from each other in azimuth angle;

4) processing output signals of the first and second magnetic heads; and 5) controlling the processing by the step 4) in response to the reproduction control signal generated by the step 3).

\* \* \* \* \*